March 21, 1933.     M. LARSSON     1,902,649
METHOD OF PRODUCING AMMONIUM SULPHATE
Filed Oct. 25, 1930
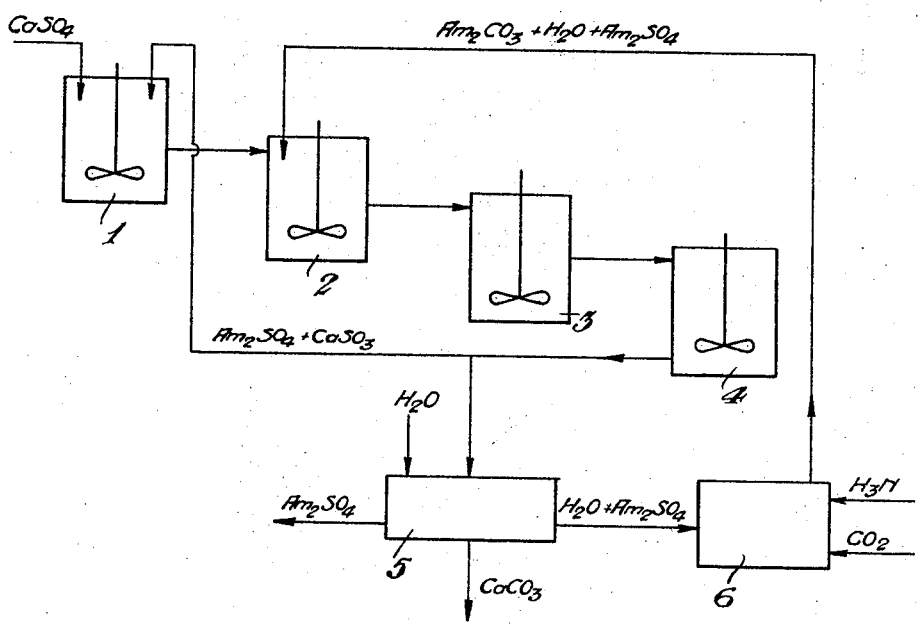
INVENTOR
MARKUS LARSSON
BY *Arthur Miaoeston*
ATTORNEY Patented Mar. 21, 1933

1,902,649

UNITED STATES PATENT OFFICE

MARKUS LARSSON, OF BERLIN, GERMANY, ASSIGNOR TO KUNSTDÜNGER-PATENT-VERWERTUNGS-AKTIENGESELLSCHAFT, OF GLARUS, SWITZERLAND

METHOD OF PRODUCING AMMONIUM SULPHATE

Application filed October 25, 1930, Serial No. 491,104, and in Sweden November 9, 1929.

This invention relates to an improved method of producing ammonium sulphate from calcium sulphate and ammonium carbonate.

It is known to produce ammonium sulphate by suspending calcium sulphate in water and supplying ammonia and carbon dioxide or ammonium carbonate to the suspension, thus precipitating calcium carbonate while a solution of ammonium sulphate is obtained. For such reaction natural gypsum as well as precipitated calcium sulphate obtained as a waste product in chemical processes have been used. The temperature in performing said reaction has hitherto generally been above 45° C.

In performing said known process the calcium carbonate is precipitated in a rather fine state which causes a considerable difficulty in separating the ammonium sulphate solution from the precipitate.

The object of this invention is to overcome said drawback by performing the reaction under such conditions that the calcium carbonate is precipitated in a more coarse form than hitherto.

The invention consists, chiefly, in performing the reaction continuously in such manner that gypsum suspended in a solution of ammonium sulphate and a solution of ammonium carbonate are continuously supplied to a reaction vessel containing a large bulk of finished reaction products, and removing continuously finished reaction products from said vessel, thus causing the reaction to take place in presence of a substantially constant percentage of precipitated calcium carbonate. The greater part of calcium carbonate formed is in this manner brought to deposit on the calcium carbonate crystals present in the solution whereby a coarse calcium carbonate is obtained which can be easily separated from the ammonium sulphate solution. Under the conditions above stated the reaction can be performed sufficiently rapid already at temperatures between 20 and 40° C., this being favourable for the reason that the pressure of dissociation of the ammonium carbonate is rather low at said temperature.

The process is, preferably, performed in a series of reaction vessels provided with stirring devices, the reaction products flowing through said vessels with a regulated speed by their gravity. In the first reaction vessel calcium sulphate is suspended in a comparatively large quantity of ammonium sulphate solution, preferably in a solution of ammonium sulphate containing calcium carbonate in suspension as obtained in the process, so that the percentage of precipitated calcium carbonate in the reaction vessel in which the chief part of the reaction takes place will be as large as possible. The calcium sulphate sludge flows by its gravity in a regulated stream to the next vessel to which also a quantity of ammonium carbonate solution corresponding to the gypsum is supplied. The percentage of water supplied with the reaction materials is suited in such manner that an ammonium sulphate solution of substantially constant strength and with the greatest possible concentration is obtained as end product. If the solution used in suspending the calcium sulphate contains 40% of ammonium sulphate the ammonium carbonate solution supplied should contain 44% of ammonium carbonate for the purpose of obtaining an ammonium sulphate solution of constant strength after the reaction.

From the second reaction vessel the reaction products flow to the next vessel or vessels in which the reaction is finished. As the reaction takes place very rapidly the second reaction vessel will always contain a high and substantially constant percentage of calcium carbonate also in the case that a pure ammonium sulphate solution is used for the suspension of the calcium sulphate, the reaction thus taking place as soon as the process has started in a rather concentrated solution of ammonium sulphate and in presence of a large percentage of suspended crystals of calcium carbonate which during the reaction increase in size by the calcium carbonate formed in process depositing on the crystals already present in the solution. The calcium carbonate of the finished reaction products will, therefore, to a large extent be of a coarse-crystalline state and can be easily separated from the solution by filtering, for instance in a continuous filter.

As raw material in the process I can use natural gypsum and anhydrite as well as calcium sulphate obtained as a waste product in chemical reactions, as for instance in leaching phosphate rock with sulphuric acid or acid solutions containing alkali sulphate.

The ammonium carbonate is, preferably, used in a slight excess over the calcium sulphate in order to secure a complete conversion of the calcium sulphate. The ammonium carbonate solution is produced by the absorption of ammonia and carbon dioxide in water or in a weak solution of ammonium sulphate obtained in washing the calcium carbonate precipitated. The carbon dioxide may, if desired, be regenerated by dissolving the calcium carbonate produced in an acid, as for instance nitric acid, or be obtained from combustion gases in well-known manner.

In the annexed drawing I have diagrammatically shown an embodiment of an apparatus for performing the process.

Referring to the drawing, 1 to 4 are four reaction vessels provided with stirring devices. To the vessel 1 calcium sulphate, obtained for instance from a phosphoric acid plant, and a portion of the reaction products from the last reaction vessel 4 are supplied. The relation of the gypsum to the reaction products returned is so chosen that for each kg of gypsum about 0.5 liter of reaction products are returned if the latter contain a 40% ammonium sulphate solution. The sludge formed in the vessel 1 flows by its gravity to the vessel 2 with a regulated speed and to the latter vessel, which during the reaction contains a large bulk of finished reaction products with a high percentage of precipitated calcium carbonate, also ammonium carbonate is supplied in a quantity that is substantially equivalent to the calcium sulphate supplied, said ammonium carbonate being produced by absorption of ammonia and carbon dioxide in washing water containing ammonium sulphate and obtained in the washing of the separated calcium carbonate in a filter plant 5 in which the ammonium sulphate solution is separated from the calcium carbonate. The quantity of ammonium carbonate solution should be 0.81 liter per kg. of the calcium sulphate supplied if the strength of the ammonium carbonate solution is 44%. The temperature is, preferably, kept about at 40° C. in the first vessel 1 and about at 35° C. in the other vessels 2, 3 and 4. From the reaction vessel 4 a portion of the reaction products are returned in a continuous flow to the vessel 1 and are in said vessel mixed with the calcium sulphate supplied as above described while the remainder is supplied to the continuous working filter plant 5 in which the ammonium sulphate solution is separated from the calcium carbonate which latter is then washed with water so that it leaves the process practically free from ammonium sulphate. The washing water obtained with its content of ammonium sulphate is saturated with ammonia and carbon dioxide in an absorption plant 6 so that a 44% solution of ammonium carbonate is obtained which in a continuous stream is supplied to the vessel 2 as above described. The process is thus carried out continuously and gives a 40% ammonium sulphate solution. The filtering is easily performed on account of the coarse-crystalline state of the chief part of the calcium carbonate, the contents of water in the filter cake after washing being about 18% only.

The example above described may be modified for instance in such manner that instead of reaction products from the vessel 4 a portion of the clear ammonium sulphate solution obtained in the filtering plant 5 is returned in the process.

What I claim is:—

1. In a method of continuously producing ammonium sulphate in which calcium sulphate is reacted upon by means of ammonium carbonate, the process which consists in forming a suspension of the calcium sulphate in a slurry of finished reaction products consisting chiefly of ammonium sulphate solution and precipitated calcium carbonate, adding a solution of ammonium carbonate to said slurry in sufficient quantity to react with calcium sulphate, returning a portion of the reaction products to the process as suspending means for the calcium sulphate in the continuous performance of the process, and separating the ammonium sulphate solution from the insoluble matters of the reaction products not returned.

2. In a method of continuously producing ammonium sulphate in which calcium sulphate is reacted upon by means of ammonium carbonate, the process which consists in forming a suspension calcium sulphate in a slurry of ammonium sulphate solution and precipitated calcium carbonate obtained in the process, adding a solution of ammonium carbonate, to said slurry in sufficient quantity to react with the calcium sulphate, returning a portion of the unseparated reaction products to the process as suspending means for the freshly supplied calcium sulphate, filtering off the chief part of the ammonium sulphate solution from the insoluble matters of the reaction products not returned, washing the residue of insoluble matters, and absorbing ammonia and carbon dioxide in the wash waters to produce the ammonium carbonate solution required in the continuous performance of the process.

In testimony whereof I have signed my name.

MARKUS LARSSON.